(12) United States Patent
Robinson, Jr. et al.

(10) Patent No.: US 11,351,502 B2
(45) Date of Patent: Jun. 7, 2022

(54) METAL FOIL CATALYST FOR THE CONTROL OF EMISSIONS FROM DIESEL ENGINES

(71) Applicant: Catalytic Combustion Corporation, Bloomer, WI (US)

(72) Inventors: John W. Robinson, Jr., Bloomer, WI (US); Donald R. Verdegan, Bloomer, WI (US); D. Todd Jacobs, Lago Vista, TX (US)

(73) Assignee: Catalytic Combustion Corporation, Bloomer, WI (US)

( * ) Notice: Subject to any disclaimer, the term of this patent is extended or adjusted under 35 U.S.C. 154(b) by 99 days.

(21) Appl. No.: 17/052,735

(22) PCT Filed: Jan. 14, 2019

(86) PCT No.: PCT/US2019/013433
§ 371 (c)(1),
(2) Date: Nov. 3, 2020

(87) PCT Pub. No.: WO2019/194881
PCT Pub. Date: Oct. 10, 2019

(65) Prior Publication Data
US 2021/0322924 A1 Oct. 21, 2021

Related U.S. Application Data

(60) Provisional application No. 62/667,026, filed on May 4, 2018.

(51) Int. Cl.
*B01D 53/94* (2006.01)
*B01J 21/02* (2006.01)
(Continued)

(52) U.S. Cl.
CPC ............ *B01D 53/944* (2013.01); *B01J 21/02* (2013.01); *B01J 23/42* (2013.01); *B01J 35/04* (2013.01);
(Continued)

(58) Field of Classification Search
CPC ........ B01D 2255/1021; B01D 53/9477; B01D 2255/206; B01D 2258/012;
(Continued)

(56) References Cited

U.S. PATENT DOCUMENTS 4,725,411 A * 2/1988 Cornelison ............... B01J 35/04
502/527.22
4,869,738 A * 9/1989 Alcorn ................. F01N 3/0226
55/284
(Continued)

FOREIGN PATENT DOCUMENTS

DE 2 951 316 A * 7/1981 ........... F01N 3/0222
DE 19921609 A1 11/2000
(Continued)

*Primary Examiner* — Timothy C Vanoy
(74) *Attorney, Agent, or Firm* — GableGotwals (57) ABSTRACT

A diesel engine emissions catalyst which may be used to fill a niche between standard oxidation catalyst and diesel particulate filters for control of diesel particulate matter. The catalyst includes a structure (substrate) comprising one or more coated, corrugated micro-expanded metal foil layers. The coated surface may be a high surface area, stabilized, and promoted washcoat layer. The corrugated pattern may include a herringbone-style pattern that, when in use, is oriented in a longitudinal direction of the diesel engine exhaust flow. The micro-expanded metal foil provides small openings or eyes that, as the exhaust flow passes through the catalyst (transverse to the eye opening), particulates in the flow impinge on the surface and becomes trapped in the eyes. The catalyst may be used to treat a locomotive engine (Continued)

exhaust stream and may be used with a selective catalyst reduction system.

15 Claims, 5 Drawing Sheets

(51) Int. Cl.
    *B01J 23/42*     (2006.01)
    *B01J 35/04*     (2006.01)
    *B01J 35/10*     (2006.01)
    *B01J 37/02*     (2006.01)
    *B01J 37/08*     (2006.01)
    *F01N 3/28*     (2006.01)

(52) U.S. Cl.
    CPC ....... *B01J 35/1019* (2013.01); *B01J 37/0225* (2013.01); *B01J 37/08* (2013.01); *F01N 3/281* (2013.01); *B01D 2255/1021* (2013.01); *B01D 2255/206* (2013.01); *B01D 2255/2092* (2013.01); *B01D 2255/9202* (2013.01); *B01D 2255/9207* (2013.01); *F01N 2330/02* (2013.01); *F01N 2370/02* (2013.01); *F01N 2510/00* (2013.01)

(58) Field of Classification Search
    CPC ............ B01D 2259/4566; B01D 53/88; B01D 2255/2092; B01D 2251/2062; B01D 53/944; B01D 2255/9207; B01D 2255/9202; B01J 35/04; B01J 21/02; B01J 23/6522; B01J 35/1019; B01J 23/42; B01J 37/0225; B01J 37/08; B21D 31/04; B21D 31/02; F01N 2330/30; F01N 3/103; F01N 2370/02; F01N 2510/06; F01N 2330/48; F01N 13/16; F01N 2330/02; F01N 2510/00; F01N 2330/34; F01N 3/2814; F01N 2330/42; F01N 3/281

See application file for complete search history.

(56) References Cited

U.S. PATENT DOCUMENTS

2007/0292707 A1* 12/2007 Maus .................... F01N 3/0222
                                                                                             428/116
2010/0269491 A1* 10/2010 Boorse .................... F01N 3/022
                                                                                             60/299
2015/0165423 A1     6/2015   Sung et al.

FOREIGN PATENT DOCUMENTS

| | | | |
|---|---|---|---|
| DE | 102006005788 A1 | 8/2007 | |
| JP | 2005 296 820 A * | 10/2005 | ............... F01N 3/02 |
| JP | 2005296820 A | 10/2005 | |
| WO | 2006050971 A1 | 5/2006 | |
| WO | 2012123618 A1 | 9/2012 | |

* cited by examiner

METAL FOIL CATALYST FOR THE CONTROL OF EMISSIONS FROM DIESEL ENGINES

CROSS-REFERENCE TO RELATED APPLICATIONS

This United States application is the National Phase of PCT Application No. PCT/US2019/013433 filed 14 Jan. 2019, which claims priority to U.S. Provisional Patent Application No. 62/667,026 filed 4 May 2018, each of which is incorporated herein by reference.

BACKGROUND

This disclosure is in the field of catalysts and, more particularly, catalysts intended to treat emissions from diesel engines such as, but not limited to, diesel engines used in non-road applications.

Emission standards for non-road diesel engine emissions have been increasingly tightened through the years. Examples of this are EPA Tier 4 emission standards. In some applications, nitrogen oxide ("NOx") emissions cannot be greater than 5 ppm to 10 ppm and may require 99% reduction efficiency. Diesel emissions contain diesel particulate matter ("DPM") comprised of about 80% unburned diesel fuel, referred to as the soluble oil fraction, and elemental carbon particles. To date, DPM control has primarily focused on engineering improvements to the engines. However, the cost and availability of the improvements has not met industry needs, leading to other solutions like exhaust after-treatment. Exhaust after-treatment solutions include oxidation catalysts and diesel particulate filters or wire meshes.

Oxidation catalysts, which may employ either ceramic or metal foil based substrates in various cell densities and geometrical shapes, typically achieve a 20% to 40% conversion of DPM and can have a short operational life. Diesel particulate filters achieve higher conversion, about a 95% conversion or more. However, the filters induce a higher backpressure on the engine, thus robbing horsepower. The filters also require in-situ regeneration and may require frequent cleaning to remove non-combustible particulate debris. Additionally, the oxidation catalysts and filters may not provide a suitable solution for many types of diesel engine applications and their associated emission requirements.

SUMMARY

A diesel engine emissions catalyst of this disclosure may be used to fill a niche between standard oxidation catalyst and diesel particulate filters for the control of diesel particulate matter ("DPM"). In embodiments, the catalyst, which may be referred to as a diesel oxidation trap catalyst ("DOT"), includes a structure (substrate) comprising one or more coated, corrugated micro-expanded metal foil layers and a frame housing or encapsulating the substrate. The coated surface may be a high surface area, stabilized, and promoted washcoat layer. The corrugated pattern may include a herringbone-style pattern that, when in use, is oriented in a longitudinal direction of the diesel engine exhaust flow. The micro-expanded metal foil provides small openings or eyes that, as the exhaust flow passes through the catalyst (transverse to the eye opening), DPM in the flow impinges on the surface and becomes trapped in the eyes. In some embodiments, the catalyst may be used to treat a locomotive engine exhaust stream. In other embodiments, the catalyst may be used to treat a marine diesel engine exhaust or other heavy duty, non-road diesel engine exhaust stream. The catalyst may be used in connection with a selective catalyst reduction ("SCR") system that mixes exhaust with ammonia. Embodiments of a method for reducing diesel particulate emissions may include passing or flowing a diesel engine exhaust gas flow through a diesel engine emissions catalyst of this disclosure. Removal efficiencies may be in a range of 55% to 85%, there being subranges within this broader range.

An engine emissions catalyst of this disclosure may comprise a substrate including one or more coated, corrugated, micro-expanded metal foil layers, each of said layers containing a plurality of eyes containing openings in a range of about 0.002 in to about 0.08 in (0.058 mm to 2.032 mm); a coating of each said layer including a washcoat layer and a precious, the washcoat layer being in a range of 80.5 g/l to 102.5 g/l, including a metal oxide, and having a porous surface area in a range of 100 $m^2/g$ to 250 $m^2/g$ (488,246 $ft^2/lb$ to 1,220,616 $ft^2/lb$) of the metal oxide, the precious metal being in a range of about 2 $g/ft^3$ to about 40 $g/ft^3$ (0.071 g/l to 1.41 g/l); flow channels per unit area of a face of the substrate being in a range of about 100 cells/$in^2$ (15 cells/$cm^2$) to about 400 cells/$in^2$ (62 cells/$cm^2$); and a frame housing the substrate. The washcoat layer may include at least one rare each oxide, a promotor, or both the rare earth oxide and the promotor.

A metal of the metal foil layers may include chromium and aluminum. The metal foil layer may be a heat treated metal foil layer. The metal foil layer may be an acid etched or a thermally treated metal foil layer. The precious metal may be platinum. The metal oxide may include aluminum oxide. The coating may include a rare earth oxide or a promotor or both. Each metal foil layer may include a corrugated pattern configured for orientation in a longitudinal direction of a diesel engine exhaust flow. The corrugated pattern may be a herringbone pattern.

ELEMENTS AND NUMBERING USED IN THE DRAWINGS AND DETAILED DESCRIPTION

10 Diesel engine emissions catalyst (diesel oxidation trap catalyst or "DOTC"
11 Structure or substrate
13 Micro-expanded metal foil layer
15 Frame
17 Micro-expanded metal foil
19 Openings or eyes of 17
21 Coated surface
23 Washcoat layer
25 Corrugated pattern
27 Flow channels
29 Catalyst face
30 Selective catalyst reduction ("SCR") system
31 Injector
33 Mixing process
35 SCR reactor
37 DOTC reactor
L Longitudinal direction relative to exhaust flow
T Transverse direction relative to exhaust flow

Definitions

For the purpose of this disclosure, the following definitions apply.

A layer is a single sheet, quantity, or thickness of a material (e.g. one sheet of metal foil or one washcoat thickness) as opposed to multiple sheets, quantities, or thicknesses of materials.

A micro-expanded metal foil is a non-woven metal sheet containing a plurality of fabricated spaced apart openings or eyes, each eye sized to trap a predetermined range of particulate matter and lying in substantially the same plane as all other eyes (prior to corrugation).

Density of cells of a corrugated pattern is the number of flow channels per unit area of a catalyst face.

High surface area is the surface area of all the microscopic pores in a washcoat layer as measured by the Brunauer, Emmett, and Teller ("BET") method.

The tolerance range for cell density may be ±5 cells per $in^2$ (0.8 cells per $cm^2$), the term, about, indicating this range.

The tolerance range for mass loading of a washcoat layer may be ±12%, the term, about, indicating this range.

DETAILED DESCRIPTION

Referring to the drawings, a diesel engine emissions catalyst or diesel oxidation trap catalyst ("DOTC") 10 of this disclosure includes a structure (substrate) 11 comprising one or more coated, corrugated layers 13 of micro-expanded metal foil 17 and a frame 15 housing or encapsulating the substrate 11. The metal foil layer 13 may be about 0.002 inches thick (0.0508 mm). The micro-expanded metal foil 17 includes small openings or eyes 19. The coated surface 21 may be a high surface area, stabilized, and promoted washcoat layer 23. The corrugated pattern 25 may include a herringbone-style pattern that, when in use, is oriented in a longitudinal direction L of the diesel engine exhaust flow (transverse T to the eye 19), with flow impinging on the metal foil strand walls 23 surrounding the eyes 19.

The density of cells of the corrugated pattern 25—defined as the number of flow channels 27 per unit area of the catalyst face 29—may be in a range of about 100 cells/$in^2$ (15 cells/$cm^2$) to about 400 cells/$in^2$ (62 cells/$cm^2$), there being subranges within this broader range, as well as ranges and subranges on either side. See Table 1.

TABLE 1

Example Cell Densities of Embodiments (per square area).

| $in^2$ | $cm^2$ |
| --- | --- |
| 50 | 7.75 |
| 60 | 9.00 |
| 70 | 11.00 |
| 80 | 12.50 |
| 90 | 14.00 |
| 100 | 15.50 |
| 150 | 23.25 |
| 200 | 31.00 |
| 250 | 38.75 |
| 300 | 46.50 |
| 350 | 54.25 |
| 400 | 62.00 |
| 450 | 69.75 |
| 500 | 77.50 |
| 550 | 85.25 |
| 600 | 93.00 |
| 650 | 100.75 |
| 700 | 108.50 |
| 750 | 116.25 |
| 800 | 124.00 |

In embodiments, the metal foil 17 comprises an alloy suitable in its composition for use as a catalyst substrate. In some embodiments, the metal foil 17 may be a stainless steel alloy including aluminum or iron-chromium-aluminum (Fe-CrAl) alloy. By way of a non-limiting example, the alloy may be FECRALLOY™ alloy containing iron, chromium, and aluminum. The alloy may include chromium in a range of about 18 wt % to about 24 wt %, there being subranges within this range, such as but not limited to 19 wt % to 23 wt %, or 20 wt % to 22 wt %, and ranges that overlap these ranges (e.g. 21 wt % to 24 wt %). The alloy may include aluminum in a range of about 3 wt % to about 7 wt %, there being subranges within this broader range.

The metal foil 17 may contain eyes 19 in a range of 0.020 inches to 0.080 inches (0.058 mm to 2.032 mm), there being subranges within this broader range. The eyes 19 may be formed using a slitting process, with the slit portion being moved or cold-formed to create the eye 19. The eyes 19 may be spaced apart from one another both across the length and width of the foil 17. For example, a piercing tool may be used to pierce a slit or cell and pull the surrounding metal to form the eye 19, with the tool offsetting to perform another pierce-pull operation. An expanded metal machine the same as, or similar to, a BENMETAL® SP 750 expanded metal machine may be used.

The metal foil 17 may be coated with a mixture of aluminum oxide and at least one rare earth oxide and a promoter, of a type known to those skilled in the art, to form a high surface area washcoat layer 23. The washcoated layer 23 may include a precious metal, a combination of at least two different precious metals, a non-precious metal catalytically reactive element, or some combination of a precious and a non-precious metal catalytically reactive element, the metals being ones known in the art and selected for the intended reaction. In some embodiments, the precious metal may be a platinum group metal—ruthenium, rhodium, palladium, osmium, iridium, and platinum—or a platinum group metal alloy or bi-metallic catalyst. The precious metal may also comprise or include gold or silver. In embodiments, the mass loading of the washcoat layer may be about 1½ g/in³ (91.54 g/l) or in a range of 80.5 g/l to 102.5 g/l. A precious metal loading may be on top of or in addition to this washcoat loading.

The coated substrate 11 may be encapsulated into a structural frame 15 in which two or more substrates 11 may be combined into one larger structure to facilitate installation into, or retention of, the catalyst 10 in an exhaust duct, pipe, or reactor. The catalyst 10 may be oriented so that, when in use, the direction of the herringbone-style pattern is in a longitudinal direction of the diesel engine exhaust flow.

Figure 1:
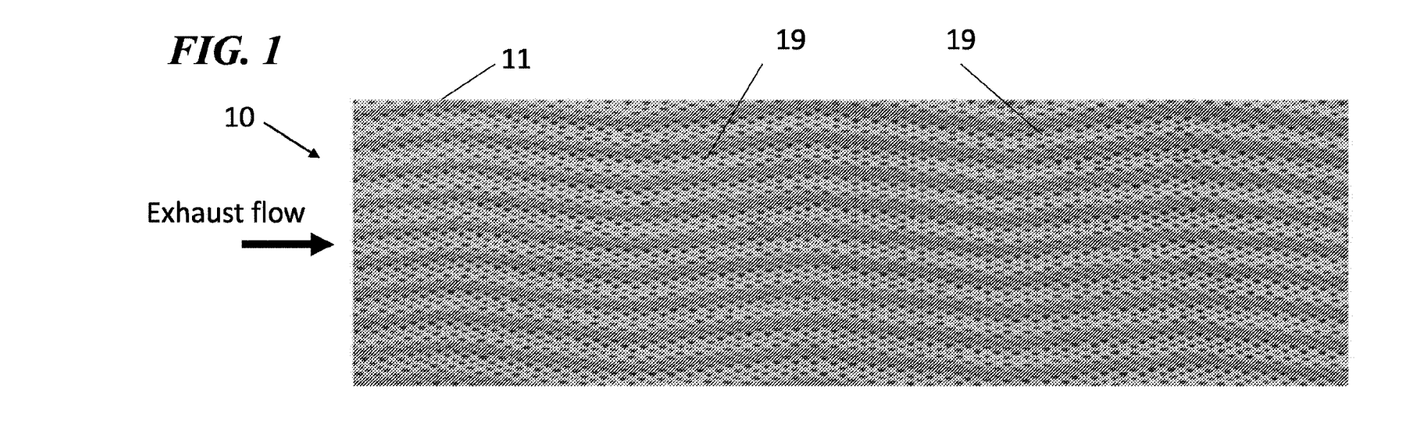
FIG. 1 is a photograph showing a top plan view of an embodiment of a micro-expanded metal foil layer of a diesel emissions catalyst of this disclosure after passing through a corrugation process. The darker bands are shadows caused by a herringbone-type pattern of the corrugated micro-expanded metal foil shading the light.
Figure 2:
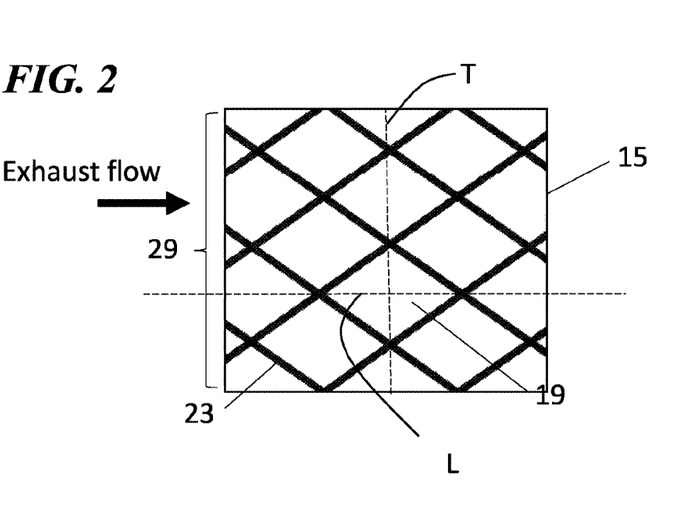
FIG. 2 is a top plan schematic view of a layer of an embodiment of a micro-expanded metal foil of this disclosure prior to corrugation to emboss a herringbone-style pattern on the foil.
Figure 3:
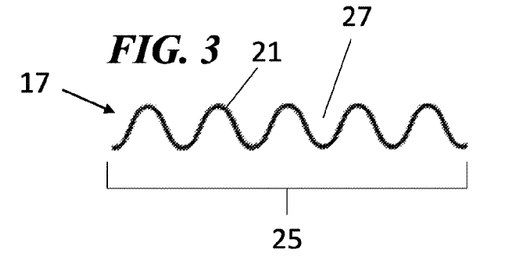
FIG. 3 is a side elevation schematic view of the micro-expanded foil of FIG. 2 after corrugation.
Figure 4:
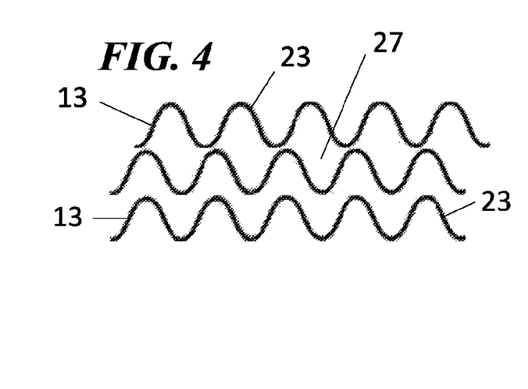
FIG. 4 is a side elevation schematic view of a layered stack of the micro-expanded foil of FIG. 2. In embodiments, the each layer may be in contact with adjacent layers.
Figure 5:
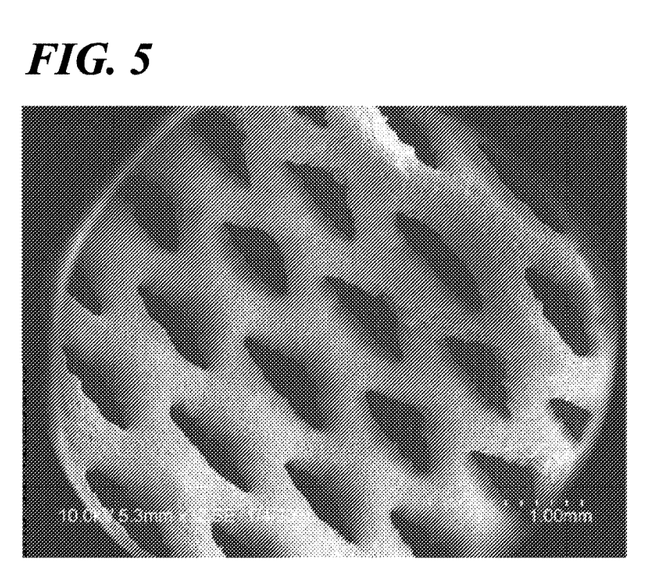
FIG. 5 is an electron microscopic image of an embodiment of a coated, corrugated micro-expanded foil of this disclosure.
Figure 6:
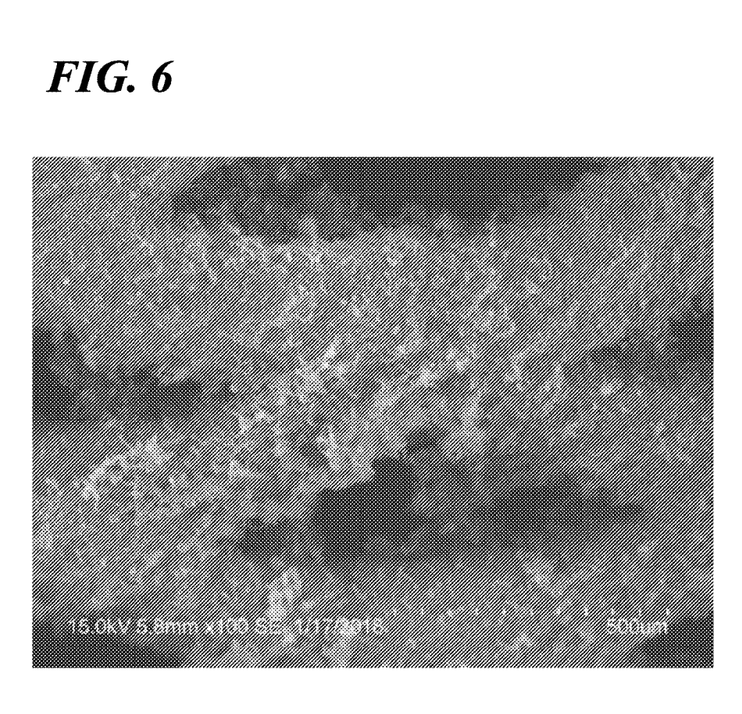
FIG. 6 is an electron microscopic image of an embodiment of this disclosure showing captured diesel particulate matter on the surface and in the "eyes" of the catalyst.
Figure 7:
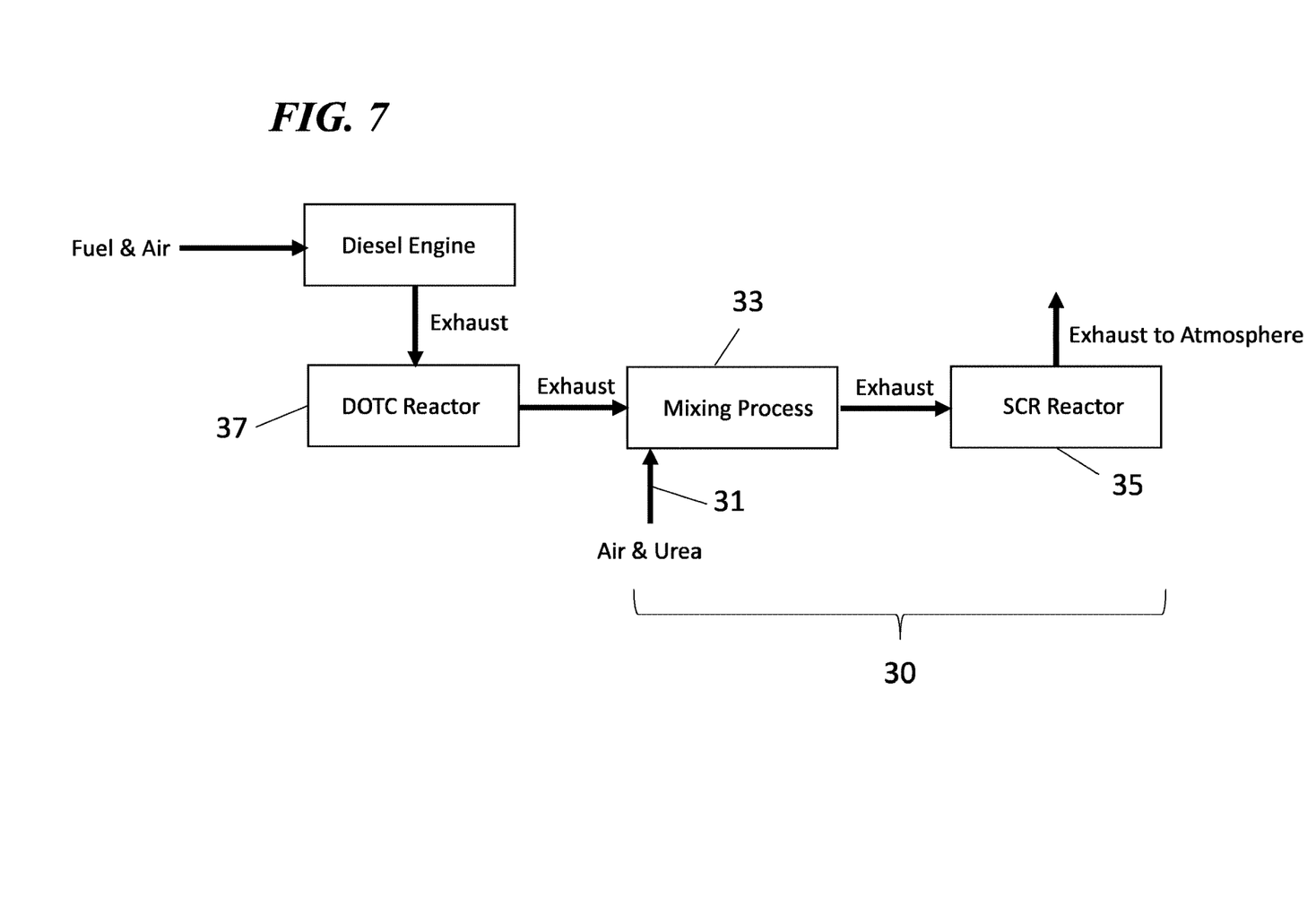
FIG. 7 is a schematic of an embodiment of a selective catalytic reduction ("SCR") system in which the diesel emissions catalyst of this disclosure may be used.
Figure 8:
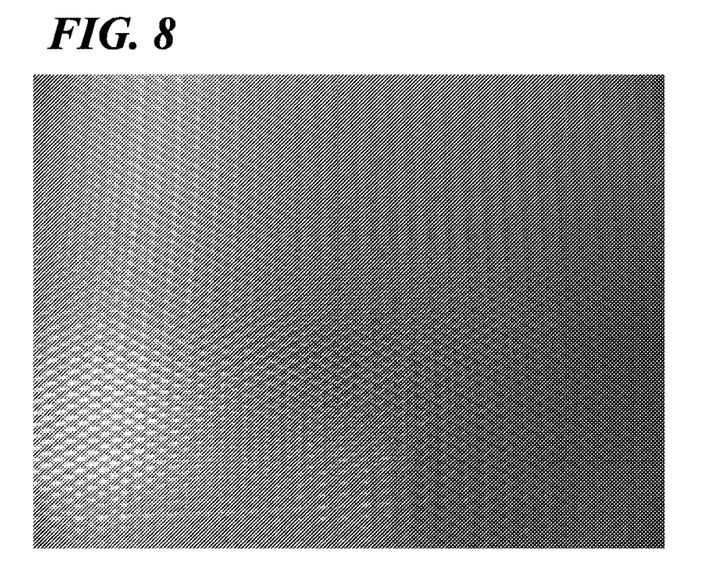
FIG. 8 is a photograph of a top plan view of an embodiment of the micro-expanded metal foil.
Figure 9:
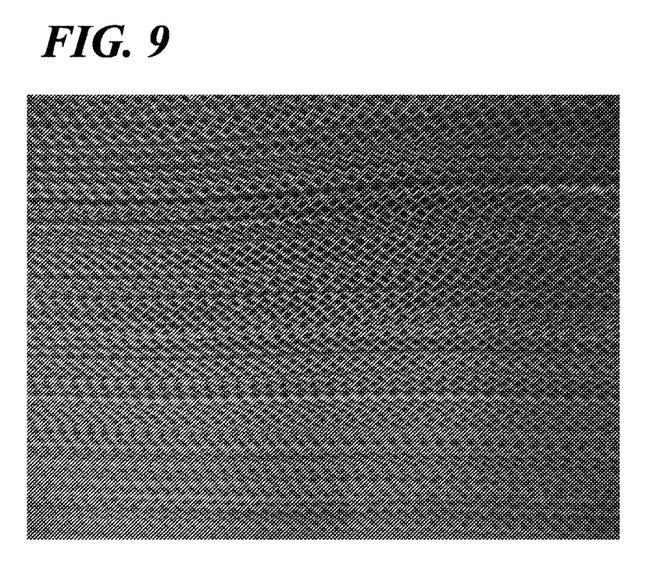
FIG. 9 is a photograph of a top plan view of a layered stack of the coated, corrugated micro-expanded foil.

Referring to FIG. 7, the catalyst 10 may be used in connection with a selective catalyst reduction ("SCR") system 30 that mixes a liquid-reductant agent with an engine exhaust stream. The SCR system 30 may include three main components: an injector 31 for the liquid-reductant agent, a mixing process 33 to mix the injected agent with an engine exhaust stream, and a reactor 35 where the reduction reaction will occur. The mixing process 33 may include a mixing duct the same as, or similar to one supplied by Catalytic Combustion Corp. (Bloomer, Wis.) for use in an SCR system. The injector 31 may be in communication with a control system (not shown). Typically, the liquid-reductant agent is an automotive grade urea known as diesel exhaust fluid ("DEF"). The ammonia needed for NOx reduction may come from the hydrolysis of the urea solution or from either anhydrous, or aqueous ammonia that is injected and evaporated within an exhaust duct, pipe, or reactor. The catalyst 10 of this invention may be placed upstream of the mixing process 33 of the SCR system 30 in a reactor 37. In some embodiments, the catalyst 10 may be housed within the reactor 35 of the SCR system 30 with appropriate ductwork channeling the flow.

In some embodiments, the diesel engine used with the catalyst 10 may be a diesel engine configured for use in a nonroad application such as construction, agricultural, and industrial applications. In other embodiments, the diesel engine may be an engine used in railway locomotives, marine vessels, or mining equipment. The catalyst 10 may be configured to achieve a known emissions standard such as EPA Tier 3, Tier 4, or other existing emission standards or a projected standard that will be promulgated within the foreseeable future to achieve nonroad emissions targets.

Using generally accepted engineering techniques, such as but not limited to design of experiments, one or more features of the catalyst 10—such as but not limited to the geometry of the eyes, the dimensional specifications of the herringbone-style pattern and the resulting cell density as previously mentioned, the composition of the catalyst washcoat, and the level of platinum in the coating—may be adjusted to further characterize the operational parameters of the catalyst formation and catalyst structure. By way of a non-limiting example, the eyes 19 may be diamond-shaped eyes or any shape and size required to trap the diesel particulate matter ("DPM"). In embodiments, the catalyst 10 may achieve a 60% to 90% reduction of DPM. The amount of precious metals may be in a range of about 2 g/ft³ to about 40 g/ft³ (0.071 g/l to 1.41 g/l), there being subranges within these broader ranges. See Table 2.

TABLE 2

Example Amounts of Precious Metal in Embodiments.

| g/ft3 | g/l |
| --- | --- |
| 2 | 0.071 |
| 3 | 0.106 |
| 4 | 0.141 |
| 5 | 0.177 |
| 6 | 0.212 |
| 7 | 0.247 |
| 8 | 0.283 |
| 9 | 0.318 |
| 10 | 0.353 |
| 11 | 0.388 |
| 12 | 0.424 |
| 13 | 0.459 |
| 14 | 0.494 |
| 15 | 0.530 |
| 16 | 0.565 |
| 17 | 0.600 |
| 18 | 0.636 |
| 19 | 0.671 |
| 20 | 0.706 |
| 21 | 0.742 |
| 22 | 0.777 |
| 23 | 0.812 |
| 24 | 0.848 |
| 25 | 0.883 |
| 26 | 0.918 |
| 27 | 0.953 |
| 28 | 0.989 |
| 29 | 1.024 |
| 30 | 1.059 |
| 31 | 1.095 |
| 32 | 1.130 |
| 33 | 1.165 |
| 34 | 1.201 |
| 35 | 1.236 |
| 36 | 1.271 |
| 37 | 1.307 |
| 38 | 1.342 |
| 39 | 1.377 |
| 40 | 1.413 |

In embodiments, a method of making a diesel engine emissions catalyst of this disclosure includes micro-expanding the metal foil 17 to provide eyes 19 and then passing the micro-expanded foil 17 through a corrugation process to emboss a herringbone-style pattern 25 on the foil 17. The corrugated foil 17 may be passed through heat or thermal treatment, acid etching, or some combination of the two to enhance surface area. Either before or after being formed into a structure (substrate) 11 suitable for installation into an exhaust duct, pipe, or reactor, the foil 17 may be coated with a mixture of aluminum oxide and at least one rare earth oxide and a promoter, of a type known to those skilled in the art, to form a high surface area washcoat layer 23. The mixture may contain various amounts of the gamma, delta, eta, or alpha alumina crystalline phases. The ratios between the crystalline phases can be varied in order to achieve the desired parameters of the washcoat. In this context, high surface area refers to the surface area of all the microscopic pores in the alumina materials. In embodiments, the surface area, as measured by the Brunauer, Emmett, and Teller ("BET") method may be in a range of about 100 m²/g to about 250 m²/g (488,246 ft²/lb to 1,220,616 ft²/lb), there being sub-ranges ranges within this broader range. See Table 3.

TABLE 3

Example High Surface Area of Washcoat Layer in Embodiments.

| m²/g | ft²/lb |
|---|---|
| 100 | 488246 |
| 110 | 537071 |
| 120 | 585896 |
| 130 | 634720 |
| 140 | 683545 |
| 150 | 732370 |
| 160 | 781194 |
| 170 | 830019 |
| 180 | 878844 |
| 190 | 927668 |
| 200 | 976493 |
| 210 | 1025318 |
| 220 | 1074142 |
| 230 | 1122967 |
| 240 | 1171791 |
| 250 | 1220616 |

The washcoated layer 23 may be impregnated with a precious metal, a combination of at least two different precious metals, a non-precious metal catalytically reactive element, or some combination of a precious and a non-precious metal catalytically reactive element, the metals being ones known in the art and selected for the intended reaction. Impregnation may occur after the washcoat or may be incorporated into the washcoat materials prior to deposition onto the corrugated foil 17.

A catalyst 10 of this disclosure may be used in an SCR system configured to reduce diesel DPM, nitrogen oxides ("NOx,") carbon monoxide ("CO"), and non-methane, nonethane hydrocarbons ("NMNEHC"). The SCR system may be configured to achieve a predetermined emission standard such as, but not limited to, EPA Tier 3, Tier 4, and other existing emission standards and projected standards that will be promulgated within the foreseeable future to achieve nonroad emissions targets.

Embodiments of a diesel engine emissions catalyst of this disclosure may include one or more of the following features:
  a substrate including one or more coated, corrugated, micro-expanded metal foil layers;
  each layer containing a plurality of eyes;
  a cell density of the corrugated pattern being in a range of about 100 cells/in² (15 cells/cm²) to about 400 cells/in² (62 cells/cm²) or in a range or subrange of Table 1;
  eyes with openings in a range of about 0.020 inches to about 0.080 inches (0.058 mm to 2.032 mm);
  openings that are circular shaped;
  openings that are diamond-shaped;
  a coating of each said layer including a precious metal, a metal oxide, and a porous surface area;
  a porous surface area in a range of about 100 m²/g to about 250 m²/g (488,246 ft²/lb to 1,220,616 ft²/lb) or in a range or subrange of Table 3;
  a mass loading of the washcoat layer of about 1½ g/in³ (91.54 g/l);
  a mass loading of the washcoat layer in a range of 80.5 g/l to 102.5 g/l.
  a frame housing the substrate;
  a metal of each said metal foil layers including chromium;
  a metal of each said metal foil layers including aluminum;
  a metal foil layer being a heat treated metal foil layer;
  a metal foil layer being an acid etched layer;
  a metal foil layer being a thermally treated metal foil layer;
  an amount of the precious metal being in a range of about 2 g/ft³ to about 40 g/ft³ (0.071 g/l to 1.41 g/l) or in a range or subrange of Table 2;
  the precious metal being at least one platinum group metal;
  the precious metal including two or more precious metals;
  the precious metal being part of a mixed metal including at least one non-precious metal;
  the metal oxide being aluminum oxide;
  a coating including a metal oxide;
  the coating including a rare earth oxide;
  the coating including a precious metal oxide;
  the coating including a promotor;
  each metal foil layer including a herringbone pattern;
  a herringbone pattern configured for orientation in a longitudinal direction of a diesel engine exhaust flow.

Experimental Field Test Results

A heavy duty diesel engine designed for locomotive applications was outfitted with an SCR system which contained an amount of a DOTC of this disclosure appropriate to the exhaust flow rate and raw DPM emissions. The engine was installed into a locomotive and was employed by a train operation in a normal manner for a period of 3000 hours. DPM emissions were measured at the initial commissioning, after 1500 hours of operation, and after 3000 hours of operation to assess whether the catalyst worked for its intended purpose, including determining the removal efficiency of the DOTC and to determine if the removal efficiency was undergoing in-service degradation. The DPM levels were measured using a gravimetric technique approved for this purpose by both the US Environmental Protection Agency ("EPA") and the California Air Resources Board ("CARB"). Additionally, at the time of measurement, the engine was operated in two representative operational cases, with Case 1 being typical for locomotive moving a train over a distance and Case 2 being typical for a locomotive moving cars around a train yard in the act of assembling a train for eventual distance travel. Case 2 is regarded, on the basis of having a higher level of uncontrolled DPM from the engine, as being the more severe test of the catalyst.

Figure 10:
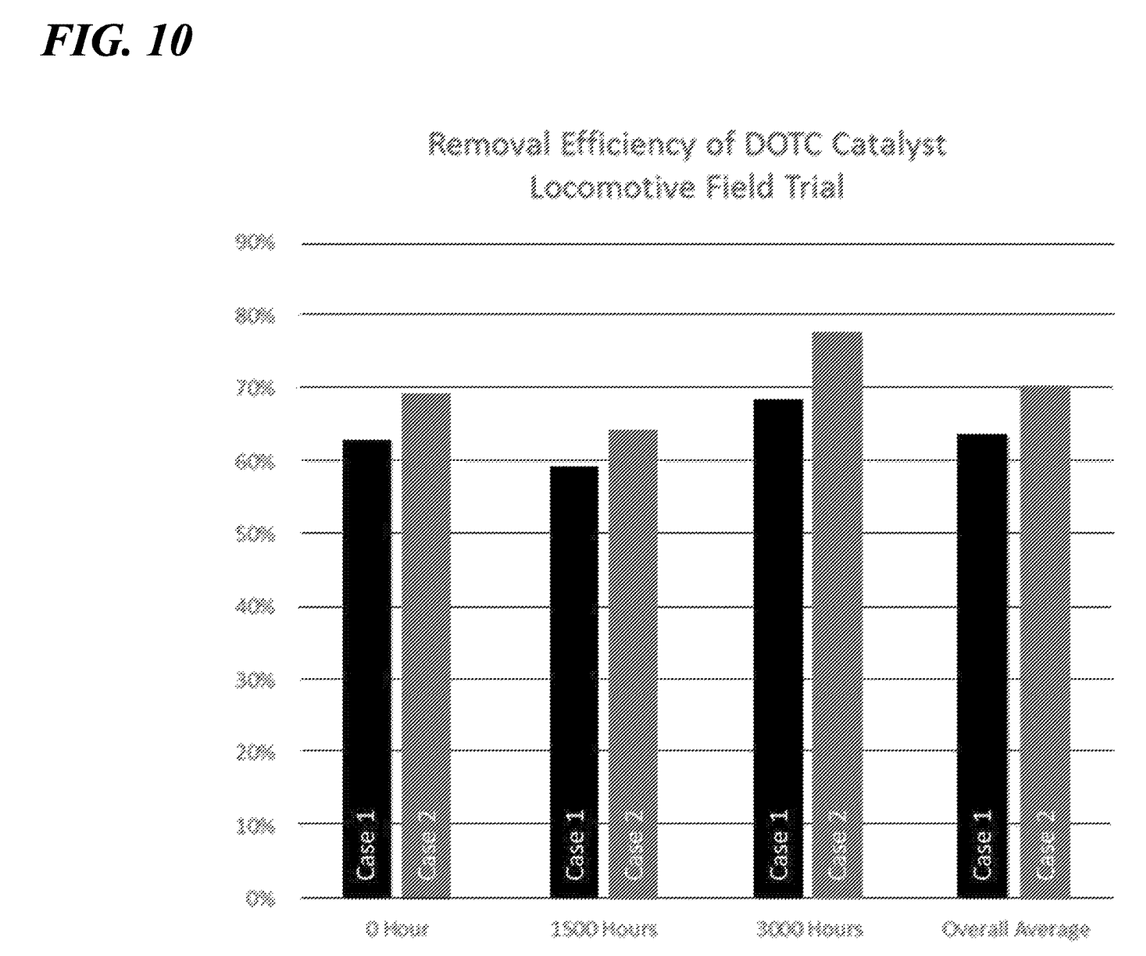
FIG. 10 is a graph showing removal efficiency results in a 3000-hour experimental field test of a catalyst of this disclosure, with Case 1 being typical for locomotive moving a train over a distance and Case 2 being typical for a locomotive moving cars around a train yard in the act of assembling a train for eventual distance travel.

As shown in FIG. 10 and in Table 4 below, the removal efficiencies in both case and case 2 remained relatively constant, showing no degradation over time. The average DOTC removal efficiencies of about 63% and 70% for Cases 1 and 2, respectively, are higher than that typically achieved by prior art oxidation catalysts. See Table 5. Although the removal efficiency is not above that of diesel particulate filters, which can achieve about a 95% conversion or more, the DOTC did not induce the higher backpressure on the engine that these filters induce.

TABLE 4

DOTC Removal Efficiency - Locomotive Field Trial.

| | Percent Removal | |
|---|---|---|
| Hours | Case 1 | Case 2 |
| 0 | 62.9 | 69.0 |
| 1500 | 59.1 | 63.4 |
| 3000 | 68.3 | 77.0 |
| Overall Avg. | 63.4 | 69.8 |

TABLE 5

Removal Efficiency Comparison of DOTC Field Trial Results to Prior Art.

| Prior Art | Typical Prior Art Efficiency % | Ratio of DOTC Efficiency to Prior Art Efficiency | |
|---|---|---|---|
| | | Case 1 - 63% | Case 2 - 70% |
| Catalyst | 20 | 3.15 | 3.50 |
| | 40 | 1.58 | 1.75 |
| Filter | 95 | 0.66 | 0.74 |

While embodiments of a diesel engine emissions catalyst and method of manufacture and use have been described, the catalyst is capable of modification by persons of ordinary skill in the art without departing from the scope of this disclosure. The claims include the full range of equivalents to which each element is entitled.

The invention claimed is:

1. A diesel engine emissions catalyst (10) comprising:
a substrate (11) consisting of a plurality of coated, corrugated, micro-expanded metal foil layers (13), each of said layers overlapping an adjacent layer of the plurality to form open flow channels in between, each said layer containing a plurality of eyes (19) with diamond-shaped openings in a range of 0.058 mm to 2.032 mm and arranged in a herringbone pattern;
a coating of each said layer comprising a washcoat layer (23) and a precious metal oxide, the washcoat layer (23) being in a range of 80.5 g/l to 102.5 g/l, including a metal oxide, and having a porous surface area in a range of 100 $m^2/g$ to 250 $m^2/g$ of the metal oxide, the precious metal being in a range of 0.071 g/l to 1.41 g/l; and
the open flow channels (27) per unit area of a face of the substrate (11) being in a range of 15 cells/$cm^2$ to 62 cells/$cm^2$.

2. A diesel engine emissions catalyst (10) according to claim 1, a metal of each said metal foil layers (13) including chromium and aluminum.

3. A diesel engine emissions catalyst (10) according to claim 1, each said metal foil layer (13) being a heat treated metal foil layer.

4. A diesel engine emissions catalyst (10) according to claim 1, each said metal foil layer (13) being an acid etched or thermally treated metal foil layer.

5. A diesel engine emissions catalyst (10) according to claim 1, the precious metal being platinum.

6. A diesel engine emissions catalyst (10) to claim 1, the metal oxide being aluminum oxide.

7. A diesel engine emissions catalyst (10) according claim 1, further comprising the washcoat layer (23) including a rare earth oxide.

8. A diesel engine emissions catalyst (10) according claim 1, further comprising the washcoat layer (23) including a promotor.

9. A diesel engine emissions catalyst (10) according to claim 1, each said metal foil layer (13) including a herringbone pattern configured for orientation in a longitudinal direction (L) of a diesel engine exhaust flow.

10. A method for reducing diesel particulate emissions, the method comprising:
passing a diesel engine exhaust gas flow through a diesel engine emissions catalyst (10) comprising:
a substrate (11) consisting of a plurality of coated, corrugated, micro-expanded metal foil layers (13), each of said layers overlapping an adjacent layer of the plurality to form open flow channels in between, each said layer containing a plurality of eyes (19) with diamond-shaped openings in a range of 0.058 mm to 2.032 mm and arranged in a herringbone pattern;
a coating of each said layer comprising a washcoat layer (23) and a precious metal oxide, the washcoat layer (23) being in a range of 80.5 g/l to 102.5 g/l, including a metal oxide, and having a porous surface area in a range of 100 $m^2/g$ to 250 $m^2/g$ of the metal oxide, the precious metal being in a range of 0.071 g/l to 1.41 g/l; and
the open flow channels (27) per unit area of a face of the substrate (11) being in a range of 15 cells/$cm^2$ to 62 cells/$cm^2$.

11. A method according to claim 10, a metal of at least one metal foil layers (13) including stainless steel.

12. A method according to claim 10, at least one metal foil layer (13) being at least one of a heat treated metal foil layer, an acid etched metal foil layer, and a thermally treated metal foil layer.

13. A method according to claim 10, the precious metal being platinum.

14. A method according to claim 10, the metal oxide being aluminum oxide.

15. A method according claim 10, further comprising the washcoat layer (23) including a rare earth oxide, a promotor, or both the rare earth oxide and the promotor.

* * * * *